United States Patent
Williams et al.

[11] Patent Number: 6,165,597
[45] Date of Patent: Dec. 26, 2000

[54] SELECTIVE CASE HARDENING PROCESSES AT LOW TEMPERATURE

[75] Inventors: Peter C. Williams, Cleveland Heights; Steven V. Marx, University Heights, both of Ohio

[73] Assignee: Swagelok Company, Solon, Ohio

[21] Appl. No.: 09/133,158

[22] Filed: Aug. 12, 1998

[51] Int. Cl.[7] .................................................. B32B 7/02
[52] U.S. Cl. .................. 428/212; 148/316; 148/319; 148/213; 148/214
[58] Field of Search ................... 148/316, 319, 148/213, 214; 428/212

[56] References Cited

U.S. PATENT DOCUMENTS

| | | |
|---|---|---|
| 1,759,690 | 5/1930 | Fleckenstein et al. . |
| 1,923,814 | 8/1933 | Egan . |

(List continued on next page.)

FOREIGN PATENT DOCUMENTS

| | | |
|---|---|---|
| 0054962B1 | 4/1985 | European Pat. Off. . |
| 0147011A2 | 7/1985 | European Pat. Off. . |
| 0421236B1 | 5/1993 | European Pat. Off. . |
| 0408168B1 | 6/1994 | European Pat. Off. . |
| 0303191B1 | 12/1994 | European Pat. Off. . |
| 0 678 589 A1 | 10/1995 | European Pat. Off. . |
| 0678589A1 | 10/1995 | European Pat. Off. . |
| 0532386B1 | 4/1996 | European Pat. Off. . |
| 0551702B1 | 6/1998 | European Pat. Off. . |
| 2236016 | 1/1975 | France . |
| 2722212A1 | 7/1995 | France . |
| 1666573A1 | 7/1991 | U.S.S.R. . |
| 1678896A1 | 9/1991 | U.S.S.R. . |
| 1752828A1 | 8/1992 | U.S.S.R. . |
| 1559690 | 1/1980 | United Kingdom . |

OTHER PUBLICATIONS

Japanese Abstract of Publication No. 04128361A, published Apr. 28, 1992.
Japanese Abstract of Publication No. 06010242A, published Jan. 18, 1994.
Japanese Abstract of Publication No. 60067651A, published Apr. 18, 1985.
Japanese Abstract of Laid–Open Publication No. 61034170A, published Feb. 18, 1986.
Japanese Abstract of Laid–Open Publication No. 52–85935, published Jul. 16, 1977.
English translation of Japanese Laid–Open (Kokai) Publication No. 10–18017. (No Date).
English translation of Japanese Laid–Open (Kokai) Publication No. 6–228732. (No Date).
"The corrosion behavior of chromium in hydrogen chloride gas and gas mixtures of hydrogen chloride and oxygen at high temperatures," *Corrosion Science*, vol. 23(2) (1983), pp. 167–181. (no month).
Lewis et al., "Metallurgical Study of Low–Temperature Plasma Carbon Diffusion Treatments for Stainless Steels," *Surface and Coating Technology*, vol. 60, 1993. (no month).
Stevenson et al., "The Effect of Process Parameters on the Plasma Carbon Diffusion Treatment of Stainless Steels at Low Pressure," vol. 63, 1994. (no month).
International Publication No. WO 00/09776, published 02/24/2000.
Abstract of Derwent Publications Ltd., London, GB, XP002137714 & DD 117 893 A (SOBE G), Feb. 5, 1976.

*Primary Examiner*—Deborah Jones
*Assistant Examiner*—Jason D Resnick
*Attorney, Agent, or Firm*—Calfee, Halter, & Griswold, LLP

[57] ABSTRACT

A selectively case hardened steel article by low temperature carburization includes a body made of a chromium bearing nickel or ferrous based alloy (for example, stainless steel), a first portion of the body having a first hardness characteristic, and a second portion of the body having a second hardness characteristic; the second portion being less than the entire body and substantially free of carbides. One method for selective case hardening by low temperature carburization includes the steps of applying a carbon blocking mask over surface areas of the article that are not going to be carburized; activating those surface areas that are to be carburized; diffusing carbon into the activated surface areas at a temperature below which carbides readily form; and removing the carbon blocking mask.

37 Claims, 2 Drawing Sheets

U.S. PATENT DOCUMENTS

| | | |
|---|---|---|
| 2,057,813 | 10/1936 | Babinet . |
| 2,204,148 | 6/1940 | Nelms . |
| 2,332,441 | 10/1943 | Fleischmann . |
| 2,789,930 | 4/1957 | Engelhard . |
| 2,851,387 | 9/1958 | Low . |
| 3,344,817 | 10/1967 | Connard . |
| 3,408,327 | 10/1968 | Gulliksen . |
| 3,765,929 | 10/1973 | Martin . |
| 3,885,995 | 5/1975 | Cunningham et al. . |
| 3,994,752 | 11/1976 | Hayes ................ 148/213 |
| 4,154,628 | 5/1979 | Dudek et al. ............ 148/213 |
| 4,165,243 | 8/1979 | Sarnes et al. ............ 419/28 |
| 4,279,528 | 7/1981 | Mangiavacchi et al. ....... 403/57 |
| 4,469,530 | 9/1984 | Wyss et al. ............ 148/213 |
| 4,664,722 | 5/1987 | Clinkscales et al. ....... 148/212 |
| 4,746,375 | 5/1988 | Iacovangelo . |
| 4,746,376 | 5/1988 | Bessey ................ 148/214 |
| 4,756,774 | 7/1988 | Fox . |
| 4,771,689 | 9/1988 | Arzoumanian et al. . |
| 4,957,421 | 9/1990 | Baldi . |
| 4,975,147 | 12/1990 | Tahara et al. . |
| 5,013,371 | 5/1991 | Tahara et al. . |
| 5,037,491 | 8/1991 | Fox . |
| 5,141,567 | 8/1992 | Tahara et al. . |
| 5,194,097 | 3/1993 | Tahara et al. . |
| 5,252,145 | 10/1993 | Tahara et al. . |
| 5,254,181 | 10/1993 | Yoshino et al. . |
| 5,308,707 | 5/1994 | Cellier et al. . |
| 5,340,412 | 8/1994 | Yoshino et al. . |
| 5,376,188 | 12/1994 | Tahara et al. . |
| 5,424,028 | 6/1995 | Maloney et al. . |
| 5,447,181 | 9/1995 | Tahara et al. . |
| 5,556,483 | 9/1996 | Tahara et al. . |
| 5,593,510 | 1/1997 | Tahara et al. . |
| 5,593,571 | 1/1997 | Heyse et al. . |
| 5,599,404 | 2/1997 | Alger ................ 148/212 |
| 5,650,022 | 7/1997 | Kitano et al. . |
| 5,653,822 | 8/1997 | Stickels et al. . |
| 5,785,711 | 7/1998 | Mitchell, Jr. et al. ........ 148/213 |
| 5,792,282 | 8/1998 | Tahara et al. . |
| 5,851,313 | 12/1998 | Milam . |

SELECTIVE CASE HARDENING PROCESSES AT LOW TEMPERATURE

TECHNICAL FIELD OF THE INVENTION

The present invention relates to processing techniques for articles of stainless steel and other alloys, such as, for example, tube coupling ferrules. More particularly, the invention relates to processes for selective case hardening such articles substantially without the formation of carbides.

BACKGROUND OF THE INVENTION

As is well known, stainless steel is commonly used for many parts and assemblies. One example is a ferrule used as part of a fluid coupling for joining tube ends. The degree to which the stainless steel must be used will vary from application to application. In some high purity systems, for example in the semiconductor and biotechnology fields, lower carbon stainless steel such as 316L for example, is commonly used. Many chemistries for stainless steel are used, and other chromium bearing nickel or ferrous based alloys are known and used other than stainless steel.

One attribute of some stainless steel alloys is that they are relatively less hard than other steel alloy materials. As a result in some applications, such as ferrules, the stainless steel article or part is provided with a hardened surface, referred to generally and herein as case hardening. The concept of case hardening is to transform a relatively thin layer of material at the surface of the part by enrichment of carbon or other ingredients to make the surface harder than the base metal alloy. This disclosure is directed to case hardening of an article by enrichment of carbon. The article thus retains in bulk the desired formability of stainless steel without the softness of the standard chemistry base metal at the article surface.

Stainless steel alloy parts are case hardened by a process generally known as carburization. Carburization is a process by which carbon atoms are diffused into the surface of the article. In some applications, such as ferrules, it is desirable to only case harden certain portions or areas of the ferrule, referred to herein as selective case hardening. Known selective case hardening processes are performed at high temperatures. However, case hardening processes performed at high temperatures greater than about 1000° F. (for stainless steel alloys) promote the formation of carbides in the hardened surface.

It is desired, therefore, to provide a new article of manufacture that is in the form of an article made of a chromium bearing nickel or ferrous based alloy and that is selectively case hardened over a surface area that is less than the entire area of the article without the formation of carbides. It is a further object of the invention to provide a carburization process for selective case hardening at low temperature that does not promote the formation of carbides.

SUMMARY OF THE INVENTION

In accordance with one embodiment of the invention, an article of manufacture is provided that is characterized by a body comprising a chromium bearing nickel or ferrous based alloy; a first portion of the body having a first hardness characteristic; and a second portion of the body having a second hardness characteristic; the second portion being less than the entire body and substantially free of carbides.

The present invention also contemplates methods for producing a selectively case hardened article including in one embodiment the steps of disposing a carbon blocking mask over a selected surface portion of the article; activating an unmasked surface portion of the article; and carburizing the unmasked portion of the article while remaining substantially free of carbides. The present invention further contemplates a product made by such a process.

These and other aspects and advantages of the present invention will be apparent to those skilled in the art from the following description of the preferred embodiments in view of the accompanying drawings.

BRIEF DESCRIPTION OF THE DRAWINGS

The invention may take physical form in certain parts and arrangements of parts, preferred embodiments and a method of which will be described in detail in this specification and illustrated in the accompanying drawings which form a part hereof, and wherein.

DETAILED DESCRIPTION OF THE PREFERRED EMBODIMENTS

Figure 1:
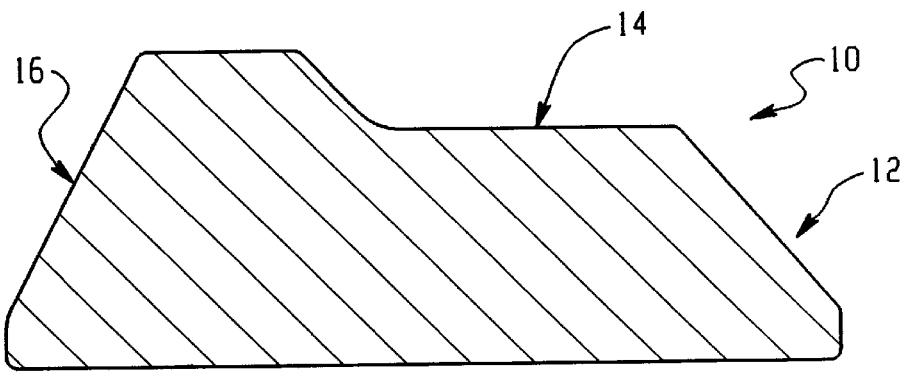
FIG. 1 is an elevation in longitudinal cross-section of a conventional ferrule.

With reference to FIG. 1, a conventional ferrule 10 is illustrated. This ferrule 10 is but one example of countless many articles and parts that can be used with the present invention. While the invention is described herein with reference to a 316 type stainless steel ferrule, such description is intended to be exemplary in nature and should not be construed in a limiting sense. The present invention finds application with any part or article made of a chromium bearing nickel or ferrous based alloy that is to be case hardened.

Furthermore, although the preferred embodiments are described herein with specific reference to articles made of stainless steel alloys, such descriptions are exemplary in nature and should not be construed in a limiting sense. The present invention is applicable to many types of chromium bearing ferrous or nickel based alloy chemistries, including but not limited to alloy 316, alloy 316L and alloy 304 stainless steels, alloy 600, alloy C-276 and alloy 20 Cb, to name a few examples.

The ferrule 10 is illustrated in FIG. 1 in partial cross-section only. This particular ferrule is a rear ferrule that is used as part of a two ferrule system. Such ferrules and ferrule systems including the ferrule geometries are well known and are fully described in U.S. Pat. Nos. 4,915,427 and 3,103,373, the entire disclosures of which are fully incorporated herein by reference.

The ferrule 10 is characterized by a tapered nose portion 12, a central body 14 and a rear drive surface 16. In a tube coupling, the rear drive surface 16 engages a wall of a nut that axially drives the nose of the ferrule 10 into a rear camming mouth of a front ferrule (not shown). This action, among other things, causes the nose portion 12 of the ferrule 10 to be driven radially inward to grip a tube end. The geometry of the ferrule 10 illustrated in FIG. 1 is exemplary in nature and will vary substantially depending on the particular ferrule system. The ferrule 10 could also be used in a single ferrule system in which case the nose portion 12 is driven into a camming mouth of a forward coupling element.

A common but not exclusive material for the ferrule 10 is 316 stainless steel alloy. To enable driving the ferrule into an enhanced grip of a tube end, it is desirable in some applications to case harden the ferrule 10. Additionally, in some applications it is also desirable to case harden only portions of the ferrule 10. For example, if the nose portion 12 can be selectively case hardened, overall performance of the ferrule system can be improved in many cases.

As used herein, case hardening means to provide a relatively thin carburized layer at the surface of the ferrule 10 to increase the surface hardness as compared to the base metal used for the ferrule 10. Carburization is a preferred method for case hardening the ferrule 10, and in accordance with one aspect of the present invention, new carburization processes are used which permit selective case hardening of the ferrule 10 over a selected area that is less than the entire part. In those cases in which it is desired to case harden an entire part, however, the carburization processes of the present invention can still be used.

Carburization in general is a process by which carbon atoms are diffused into the base alloy in solution. In order to diffuse the carbon atoms into the stainless steel, the chromium oxide layer must be removed. This step is generally known as activation or de-passivation. The surface must be activated because the oxide layer presents a substantial barrier to carbon atoms. Once activated, the surface can be carburized by diffusion at an elevated temperature.

The diffusion process can be accelerated by performing the carburization at a high temperature, for example, greater than 1000° F. (for stainless steel alloys). However, such high temperature diffusion can readily and quickly produce carbides which are carbon/chromium molecules. Carbides tend to reduce the chromium of the base alloy in some cases.

In order to prevent or substantially eliminate the formation of carbides, the present invention contemplates a carburization process for selective case hardening that is performed at a temperature that is below a carbide promoting temperature. For many chromium bearing alloys such as 316 stainless steel for example, carbides tend to readily form at carburization temperatures greater than 1000° F. Therefore, selective case hardening processes of the present invention are performed at a temperature less than about 1000° F. for stainless steel alloys. The time period during which carburization takes place also affects carbide formation. Even at temperatures below 1000° F., carbides can form if the base metal is exposed to the carbon source for a long enough period of time. In accordance with another aspect of the invention, carburization is performed below a carbide promoting temperature and for a time period less than that which permits carbides to form. Thus, the invention contemplates a time-temperature profile that substantially prevents the formation of carbides during a selective case hardening process.

As an example of such a time-temperature profile, carbides readily form in 316 stainless steel above 1000° F., as fast as within an hour. However, below this temperature, for example in the 800–950° F. range, carbides will not form until about a week or more, particularly at the lower temperature range. This is but one example, and the particular time-temperature profile used in any specific carburization process for preventing carbide formation will depend on a number of factors including but not necessarily limited to the carburization temperature and the alloy chemistry of the base metal.

FIGS. 2A–2D illustrate in a representative manner (and in partial cross-section) the various steps of a preferred carburization process in accordance with the invention for selective case hardening of a stainless steel article, in this example a ferrule. The general steps of the process are 1) applying a carbon blocking mask over surface areas of the article that are not going to be carburized; 2) activating those surface areas that are to be carburized; 3) diffusing carbon into the activated surface areas; and 4) removing the carbon blocking mask. Step 1) can be performed in at least two ways, the first being to apply a mask over the entire part and then removing (as by etching, for example) the portions overlying the surface area to be carburized; and the second being to only selectively apply the carbon blocking mask.

Figure 2A:
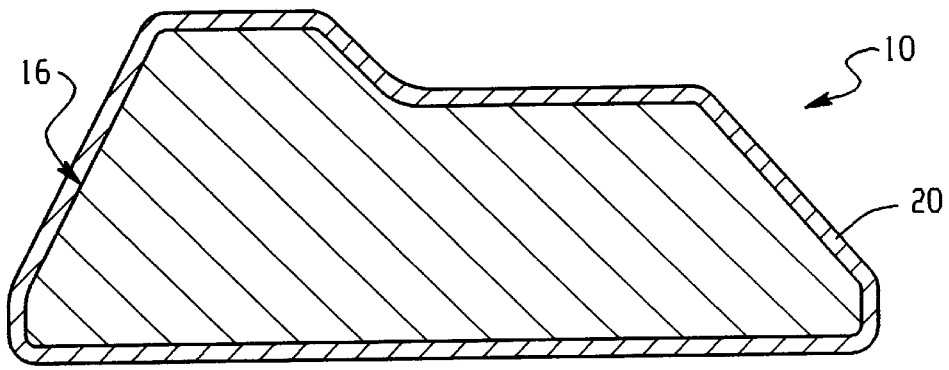
FIGS. 2A–2D illustrate diagrammatically a selective case hardening process using low temperature carburization.

In FIG. 2A, the article 10 has a carbon blocking mask 20 applied over the entire surface area. It is important to note that in FIGS. 2A–2D relative dimensions such as the respective thickness of the various layers are greatly exaggerated for clarity and ease of illustration and explanation.

In the present embodiment, the carbon blocking mask 20 is formed of copper that can be applied to the article by any suitable method, in this case by electroplating.

Figure 2B:
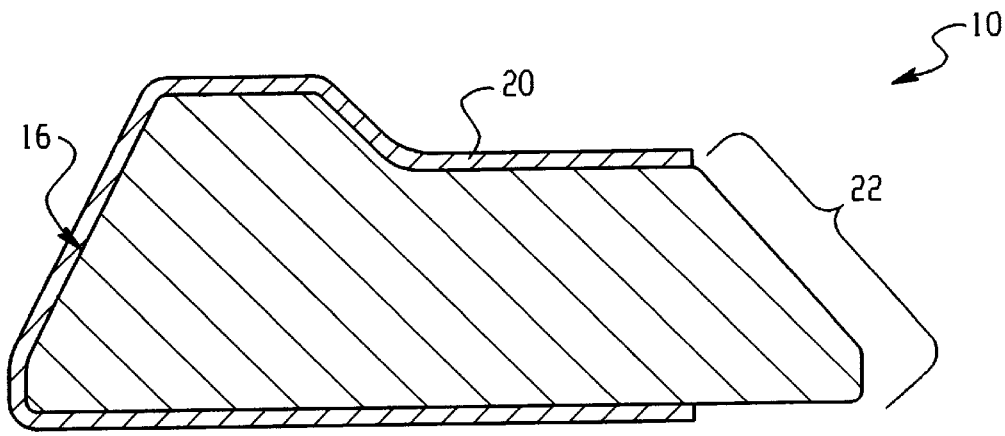

In FIG. 2B the result of the next step is illustrated. Portions of the copper mask 20 have been removed, in this example the nose area 22, such as by chemical etching, to expose the base metal. The etching process can be achieved in any number of ways. In the illustrated case, the nose portion 22 is easily accessed and the copper can be etched by simply dipping the nose portion 22 into a nitric acid bath. The acid removes the copper without attacking the base metal of the part 10.

As soon as the copper is selectively removed and the article 10 is again placed in air, the exposed unmasked portion 22 is passivated or de-activated and forms a chromium oxide layer. This passivation is virtually instantaneous with exposure to air and occurs with any stainless steel. The passive oxide layer that forms over the unmasked area 22 is a carbon blocking layer. In order to carburize the unmasked nose portion 22, the unmasked area 22 needs to be activated.

Figure 2C:
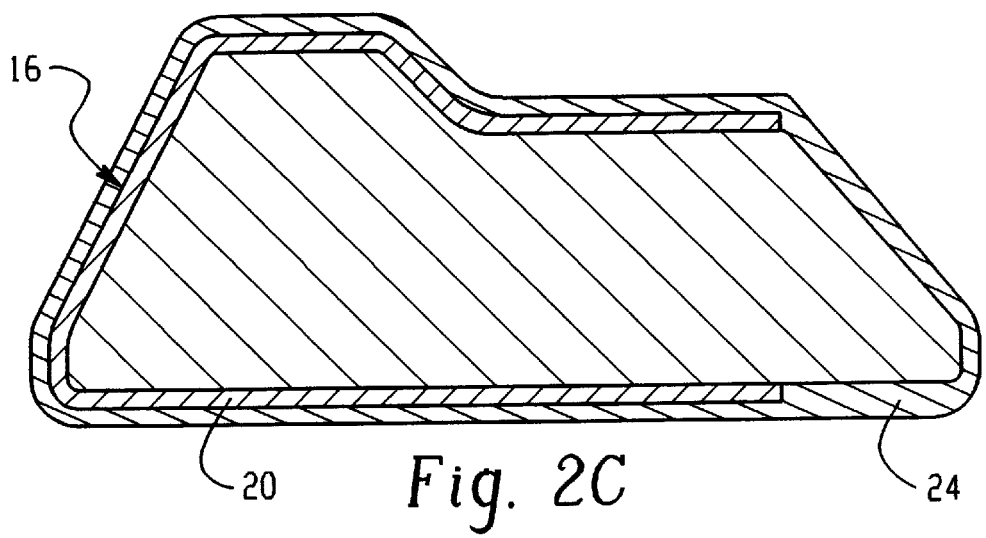

In FIG. 2C the next step is illustrated in which a layer or plate of iron 24 has been electroplated over the article 10. The iron plate 24 is applied over both the copper mask 20 and the unmasked area 22. The iron layer 24 can be applied by conventional electroplating processes, for example.

The iron layer 24 serves several important functions. First, the plating process activates the unmasked area 22. No further activation step is needed. It is noted that the copper layer also activates the underlying base metal, but this benefit cannot be used during carburization because copper is a carbon phobic layer or block. Second, it is discovered that iron easily passes carbon atoms through to the underlying base metal. In other words, iron is not a carbon blocking layer but rather is essentially transparent to carbon. Still further, the iron that overlays the copper layer 22 serves as a protective shield or mask for the copper.

In one embodiment of the invention, the carbon atoms are diffused into the article 10 by exposing the article 10 to carbon monoxide (CO) gas. The carbon atoms easily diffuse into the unmasked low carbon base metal area 22 through the iron layer 24. The temperature for diffusion is kept below 1000° F. to prevent the ready formation of carbides. The carbon atoms diffuse into a solid solution with the base metal through the iron layer 24. In accordance with this aspect of the invention, a selective case hardening process is provided that allows for gaseous carburization. In this embodiment, the carburizing gas mixture includes carbon monoxide and nitrogen at one atmosphere pressure at a temperature less than 1000° F., for example in the range of 800° F. to 980° F. The diffusion process can take up to two weeks or so at these lower diffusion temperatures depending on the amount of carbon to be diffused into the article.

Those skilled in the art will understand that the diffusion time period will determine the depth of the carbon hardened surface because diffusion rate is temperature dependent. Since time also is related to the temperature related formation of carbides, the carburization diffusion process should be controlled to achieve the desired case depth using a time-temperature profile that prevents the formation of carbides for the particular alloy in use. For example, because carbide formation is a function of time and temperature, in cases where a deep case is desired it may be necessary to reduce the temperature during the diffusion process as time goes by to prevent carbide formation. The lower the temperature of diffusion the longer the diffusion process can last without carbides forming. The drawback is the added time it may take to reach a desired diffusion depth. But in many cases, by keeping the carburization temperature below that temperature at which carbides readily form, for example less than 1000° F. for 316 stainless steel, the article can be case hardened to a sufficient depth without carbides forming.

Figure 2D:
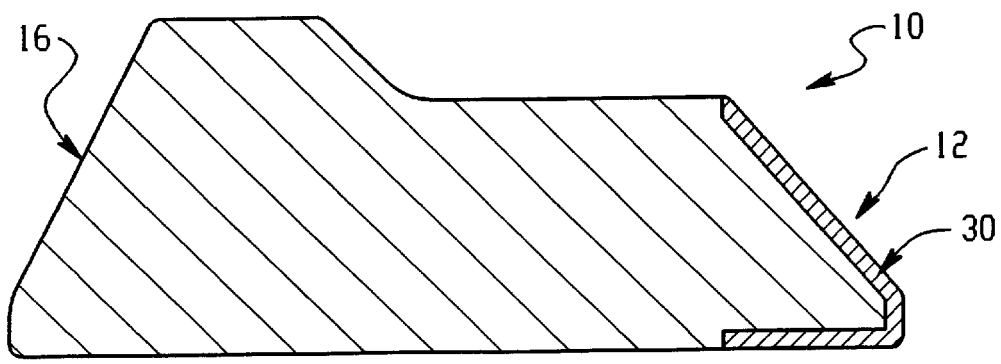

FIG. 2D shows the end result after carburization. After the carbon atoms are diffused into the unmasked portion 22, in this case the ferrule nose, a selectively case hardened portion 30 of the article 10 has been formed that is harder than the remaining portions of the article. The relative thickness of the hardened portion 30 is exaggerated in the drawings for clarity, and in practice may only be 0.001–0.003 inches or less, for example. The thickness of the carburized portion will depend on the desired mechanical properties and functional requirements of the final article.

In FIG. 2D the iron layer 24 and the copper mask 20 have been removed as by etching for example, after the diffusion process is completed. Removal of these layers allows passivation of the article 10 to provide a chromium oxide layer, including the surface area of the case hardened nose 12.

Various alternatives to the preferred process will be readily apparent to those skilled in the art. For example, other metals besides copper may be used for the carbon mask including silver, again applied by electroplating. In some applications, gold may also be a suitable masking metal. Other metals may also serve as suitable carbon blocking masks.

In the above described preferred process, carburization can be performed, as an example, with a nitrogen gas mixture at one atmosphere including 0.5 to 100% carbon monoxide, remainder nitrogen. The carburization diffusion can occur over about two weeks in a temperature profile range of 800–980° F. without the formation of carbides.

An alternative process for selective case hardening is as follows. First a carbon blocking mask is deposited on the article over those areas that are not to be case hardened. This step can be the same as previously described herein above for applying a copper mask to the article. In order to activate the unmasked portions, the article is exposed to a hydrogen halide gas mixture such as hydrogen chloride (HCl) and nitrogen at one atmosphere and at an elevated temperature for a time history that minimizes or acceptably limits the attack on and migration of the carbon blocking mask. HCl will attack, for example, a copper mask. Over time the copper will tend to migrate away from the article and be carried off by the HCl gas. The activation time however will be short as HCl is a very good activation gas. So the time period of exposing the article to the HCl gas should be kept short enough to prevent loss of the copper mask. A thicker copper mask can also be applied if required to allow sufficient activation time. A suitable exemplary temperature-time profile is 600–650° F. for about one hour using an activating gas mixture of 17–100% hydrogen chloride with remainder nitrogen at one atmosphere. Other activating gases include but are not limited to hydrogen fluoride (HF), and the activating gas selected will determine in part the time-temperature profile used. These alternative activation processes are less preferred because the activation-carburization chamber will need to be scrubbed to remove the copper traces before the next batch of parts to be carburized are processed.

The various processes described herein involving exposing the article to gas can be accomplished with conventional and commonly available equipment such as a pit furnace as is well known to those skilled in the art.

In the alternative process, after the activation step is completed, the activating gas is purged from the gas chamber but the activated article surface is not exposed to atmosphere, otherwise the article will immediately become passivated again. The activation gas is replaced in the chamber with the carburizing gas mixture. In this example, carburization is performed using a gas mixture of carbon monoxide, hydrogen and nitrogen at one atmosphere. In this example, the hydrogen is added to the carburizing gas mixture because without the iron layer the carbon monoxide gas would tend to re-passivate the activated area. An exemplary gas mixture is 0.5–60% volume carbon monoxide and 10–50% volume hydrogen, remainder nitrogen, at one atmosphere. Again, the carburization diffusion is done within a time-temperature profile and particularly at a temperature below that which would allow or promote the ready formation of carbides in the base metal alloy (e.g. less than 1000° F. for stainless steel alloys, for example in the range of 750–950° F.) for about one week (again the time parameter will vary depending on the carburization depth required).

After carburization, as in the earlier described process herein, the copper mask is removed and the article becomes passivated upon exposure to atmosphere.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. An article comprising:
    a body comprising a metal alloy;
    a first portion of said body having a first hardness characteristic; and
    a second portion of said body having a second hardness characteristic;
said second portion being less than the entire body and comprising a carburized surface area substantially free of carbides.

2. The article of claim 1 wherein said body comprises a generally homogenous chromium bearing alloy.

3. The article of claim 1 wherein said second portion is formed as a carburized area at selected locations of the body.

4. The article of claim 1 wherein said alloy comprises a chromium bearing ferrous or nickel based alloy.

5. The article of claim 4 wherein said alloy comprises stainless steel.

6. The article of claim 1 wherein said second portion comprises a carbon impregnated surface over a selected area of said body to produce a harder portion than said first portion.

7. The article of claim 6 wherein said second portion is substantially free of carbides.

8. The article of claim 1 wherein said body is a ferrule.

9. An article comprising:
a body comprising a chromium bearing alloy;
a first portion of said body having a first hardness characteristic; and
a second portion of said body less than the entire body with said second portion being carbon hardened compared to said first portion and being substantially free of carbides.

10. The article of claim 9 wherein said alloy comprises a chromium bearing ferrous or nickel based alloy.

11. The article of claim 9 wherein said second portion comprises a carburized area over a selected portion of the body.

12. A method for selectively carburizing a chromium bearing article, the method comprising:
disposing a carbon blocking mask over a selected surface portion of the article;
activating an unmasked surface portion of the article; and
carburizing said unmasked portion of the article substantially free of carbides.

13. The method of claim 12 wherein said step of disposing said mask comprises the steps of:
depositing a carbon blocking material over the entire article; and
selectively removing portions of said blocking material.

14. The method of claim 13 wherein said step of depositing material comprises applying a copper plate to the surface of the article.

15. The method of claim 14 wherein said copper plate is selectively removed.

16. The method of claim 12 wherein said activating step comprises electroplating a metal on the article at least over said unmasked area.

17. The method of claim 16 wherein said metal comprises an iron plate applied over the entire article.

18. The method of claim 12 wherein said activating step comprises exposing said unmasked portion to a hydrogen halide gas at an elevated temperature.

19. The method of claim 18 wherein said carburizing step comprises exposing said activated portion to a hydrogen bearing carburizing gas at an elevated temperature below a temperature at which carbides readily form.

20. The method of claim 12 wherein said carburizing step comprises exposing said activated portion to a carburizing gas at an elevated temperature below a temperature at which carbides readily form.

21. The method of claim 12 wherein said mask is applied by electroplating copper and said activation is performed by electroplated iron.

22. The method of claim 12 wherein said carburizing step is performed with a gas mixture of carbon monoxide and nitrogen at about one atmosphere pressure in a selected temperature range not greater than about 1000° F. for a stainless steel alloy and for a time period less than that required for the formation of carbides in the selected temperature range.

23. An article made by the following process:
disposing a carbon blocking mask over a selected surface portion of the article;
activating an unmasked surface portion of the article;
carburizing said unmasked portion of the article using a time-temperature profile that substantially prevents the formation of carbides.

24. The article of claim 23 comprising the step of removing said mask after said carburization step.

25. The article of claim 12 comprising the step of removing said mask after said carburization step.

26. The article of claim 12 wherein the step of disposing a carbon blocking mask comprises the step of electroplating selected portions of the article with copper.

27. The article of claim 12 wherein said carburizing step is performed using a time-temperature profile that substantially prevents the formation of carbides.

28. The article of claim 4, wherein the alloy is alloy 316, alloy 316L, alloy 304, alloy 600, alloy C-276 or alloy 20 Cb.

29. The article of claim 8, wherein the ferrule defines a nose portion having the second hardness characteristic.

30. The article of claim 29, wherein the ferrule is made of stainless steel.

31. The article of claim 30, wherein the stainless steel is alloy 316, 316L or 304.

32. An article comprising a shaped mass of stainless steel alloy defining a first surface area and a second surface area different from the first surface area, the second surface area being carburized, harder than the first surface area and substantially free of carbides.

33. The article of claim 32, wherein the article is a ferrule.

34. The article of claim 33, wherein the ferrule includes a nose portion defining the second surface.

35. The article of claim 34, wherein the ferrule is made from 316 or 316L stainless steel.

36. The article of claim 33, wherein the ferrule is composed of a body having a nose portion for gripping a tube end and a driving surface for driving the nose end inwardly, the nose end defining the second surface.

37. The article of claim 34, wherein the ferrule is made from 316 or 316L stainless steel.

* * * * *